United States Patent
Lee et al.

(10) Patent No.: US 9,229,602 B2
(45) Date of Patent: Jan. 5, 2016

(54) ELECTROMAGNETIC RESONANCE SENSING APPARATUS USING SMALL NUMBER OF CHANNELS

(75) Inventors: Yu-Sheop Lee, Gyeonggi-do (KR); Joo-Hoon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 208 days.

(21) Appl. No.: 13/486,620

(22) Filed: Jun. 1, 2012

(65) Prior Publication Data

US 2012/0306810 A1    Dec. 6, 2012

(30) Foreign Application Priority Data

Jun. 3, 2011    (KR) .................. 10-2011-0054033

(51) Int. Cl.
*G06F 3/044*    (2006.01)
*G06F 3/046*    (2006.01)

(52) U.S. Cl.
CPC ..................... *G06F 3/046* (2013.01)

(58) Field of Classification Search
CPC ................. G06F 3/044; G06F 3/046
USPC ........................... 345/173, 174, 179
See application file for complete search history.

(56) References Cited

U.S. PATENT DOCUMENTS

| | | | |
|---|---|---|---|
| 2010/0075720 A1* | 3/2010 | Lee .................. | G06F 1/1626 455/566 |
| 2011/0193825 A1* | 8/2011 | Yeh .................. | G06F 3/046 345/179 |
| 2011/0205191 A1* | 8/2011 | Hou .................. | G06F 3/03545 345/179 |

* cited by examiner

*Primary Examiner* — Amare Mengistu
*Assistant Examiner* — Jennifer Zubajlo
(74) *Attorney, Agent, or Firm* — The Farrell Law Firm, P.C.

(57) ABSTRACT

An electromagnetic sensing apparatus built in a touch screen having at least one soft key is provided, in which a Printed Circuit Board (PCB) has at least one sub-area corresponding to the at least one soft key, a controller has at least one input/output channel and controls electromagnetic sensing of the electromagnetic sensing apparatus, and a loop unit extends from one of the at least one input/output channel, has at least one sub-loop arranged in the at least one sub-area on the PCB, and outputs current induced by an electromagnetic field. Each sub-loop outputs a different output value with respect to the electromagnetic field.

20 Claims, 7 Drawing Sheets

ELECTROMAGNETIC RESONANCE SENSING APPARATUS USING SMALL NUMBER OF CHANNELS

PRIORITY

This application claims priority under 35 U.S.C. §119(a) to a Korean Patent Application filed in the Korean Intellectual Property Office on Jun. 3, 2011 and assigned Serial No. 10-2011-0054033, the entire content of which is incorporated herein by reference.

BACKGROUND OF THE INVENTION

1. Field of the Invention

The present invention relates generally to an electromagnetic sensing apparatus built in a touch screen having at least one soft key, and more particularly, to an electromagnetic sensing apparatus for sensing an external input from a user by sensing ElectroMagnetic Resonance (EMR).

2. Description of the Related Art

Extensive research has recently been conducted on smart phones and touch screens. A user can input a specific command to a smart phone or a touch screen by selecting a specific position or icon on the display of the smart phone or touch screen with a user's body part or an EMR pen.

The former scheme can be implemented in a capacitive type. In general, a capacitive touch screen includes transparent electrodes and condensers. As the user touches the touch screen, a mechanical displacement may be caused to the space or area of a built-in condenser. The touch may be sensed based on the resulting changed capacity of the condenser.

However, the capacitive type requires a specific pressure or displacement caused by a user's touch, thereby resulting in user inconvenience. In this context, EMR is a recent active study area.

An EMR type controls generation of electromagnetic waves by flowing current through a loop coil disposed on a Printed Circuit Board (PCB) and controls absorption of the electromagnetic waves into an EMR pen. The EMR pen may include a condenser and a loop and emit the absorbed electromagnetic waves in a specific frequency.

The electromagnetic waves emitted from the EMR pen may be absorbed again into the loop coil of the PCB so that a position near to the EMR pen can be determined based on the absorbed electromagnetic waves.

Figure 1A:
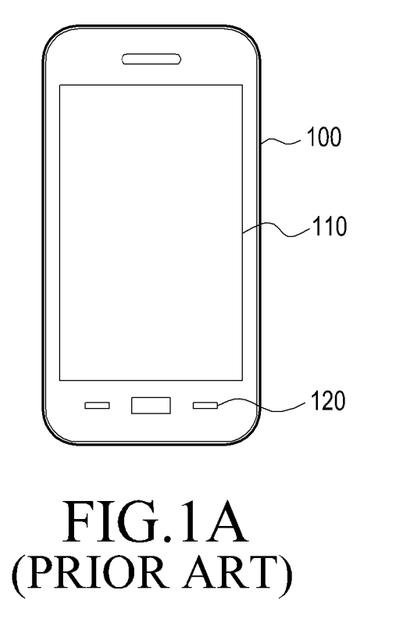
FIG. 1A illustrates a communication device with an electromagnetic sensing apparatus operating in a conventional ElectroMagnetic Resonance (EMR) scheme.
Figure 1B:
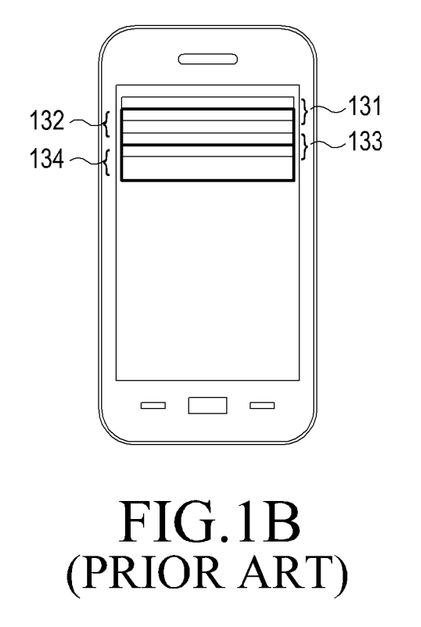
FIG. 1B illustrates a plurality of loops arranged in a display of the communication device illustrated in FIG. 1A.
Figure 1C:
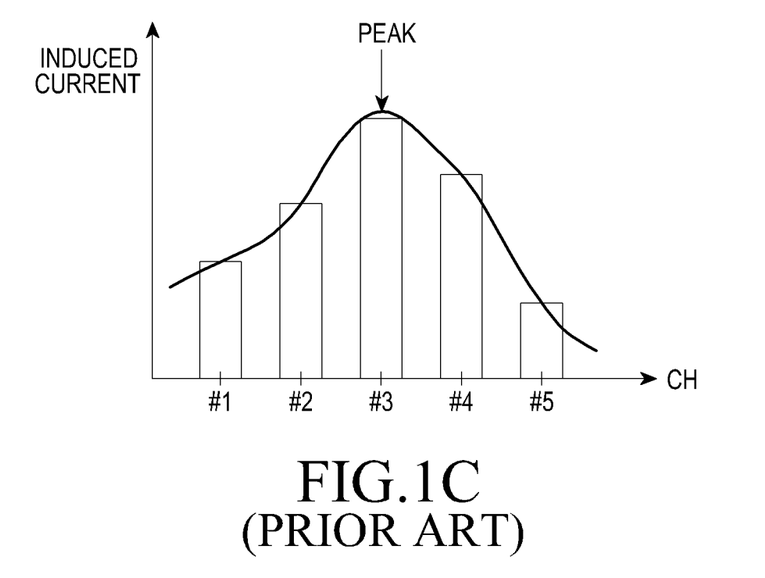
FIG. 1C illustrates induced current output from the plurality of loops illustrated in FIG. 1B.

FIGS. 1A, 1B and 1C illustrate a conventional EMR scheme.

FIG. 1A illustrates a communication device 100 with an electromagnetic sensing apparatus operating in the conventional EMR scheme. Referring to FIG. 1A, the communication device 100 may include a display 110 and soft keys 120.

The display 110 may display information visually to a user. The display 110 may operate in either of an EMR scheme and a capacitive scheme.

The soft keys 120 are a type of user interface provided separately from the display 110, which enables the user to intuitively perform basic functions such as back, cancel, menu display control, etc. Conventionally, the soft keys 120 operate only in the capacitive scheme due to limitations on accommodation of capacitive sensors and EMR sensors arranged under transparent electrodes. Soft keys having EMR sensors built in them have not been specified yet.

FIG. 1B illustrates a plurality of loops 131 to 134 arranged in the display 110. Referring to FIG. 1B, the plurality of loops 131 to 134 may be arranged overlapping with each other. When the user places an EMR pen close to a specific position, the loops 131 to 134 may sense an electromagnetic field from the EMR pen.

Referring to FIG. 1C, each of the loops 131 to 134 may output current induced by the sensed electromagnetic field. A loop nearer to the EMR pen may sense a large-amplitude electromagnetic wave and emit induced current corresponding to the sensed electromagnetic wave. Therefore, induced current with different magnitudes may be output as illustrated in FIG. 1C.

A microprocessor of the communication device 100 may determine a peak by interpolating the magnitudes of the output induced current and thus may determine a user-input position on the display.

Since only the capacitive scheme is adopted for the soft keys 120, the user should input commands by touching the soft keys 120 with his or her body part.

If channels are added to sense EMR on the soft keys 120, the numbers of channels and coils are increased. As a result, a control circuit increases in size, causing an increase in production cost.

SUMMARY OF THE INVENTION

The present invention is designed to address at least the problems and/or disadvantages and to provide at least the advantages described below.

Accordingly, an aspect of the present invention is to provide an electromagnetic sensing apparatus built in a touch screen, in which a small number of control circuit channels are used for coils arranged in a soft key area.

In accordance with the present invention, there is provided an electromagnetic sensing apparatus built in a touch screen having at least one soft key, in which a Printed Circuit Board (PCB) has at least one sub-area corresponding to the at least one soft key, a controller has at least one input/output channel and controls electromagnetic sensing of the electromagnetic sensing apparatus, and a loop unit is extended from one of the at least one input/output channel, has at least one sub-loop arranged in the at least one sub-area on the PCB, and outputs current induced by an electromagnetic field. Each sub-loop outputs a different output value with respect to the electromagnetic field.

In accordance with the present invention, there is provided an electromagnetic sensing apparatus built in a touch screen having at least one soft key, in which a PCB has at least one sub-area corresponding to the at least one soft key, a controller has first and second input/output channels and controls electromagnetic sensing of the electromagnetic sensing apparatus, a first loop unit extends from the first input/output channel, has at least one first sub-loop arranged in the at least one sub-area on the PCB, and outputs first current induced by a sensed electromagnetic field, and a second loop unit extends from the second input/output channel, has at least one second sub-loop arranged in the at least one sub-area on the PCB, and outputs second current induced by the sensed electromagnetic field.

In accordance with the present invention, there is provided an electromagnetic sensing apparatus built in a touch screen having at least one soft key, in which a PCB has at least one sub-area corresponding to the at least one soft key, a controller has first, second, and third input/output channels and controls electromagnetic sensing of the electromagnetic sensing apparatus, a first loop unit extends from the first input/output channel, has at least one first sub-loop arranged in a part of the at least one sub-area on the PCB, and outputs first current induced by a sensed electromagnetic field, a second loop unit extends from the second input/output channel, has at least one second sub-loop arranged in a part of the at least one sub-area on the PCB, and outputs second current induced by the sensed electromagnetic field, and a third loop unit extends from the third input/output channel, has at least one third sub-loop arranged in a part of the at least one sub-area on the PCB, and outputs third current induced by the sensed electromagnetic field.

BRIEF DESCRIPTION OF THE DRAWINGS

The above and other aspects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Hereinafter, embodiments of the present invention will be described with reference to the accompanying drawings. In the following description, the same elements will be designated by the same reference numerals although they are shown in different drawings. A detailed description of a generally known functions and structures of the present invention will be omitted for the sake of clarity and conciseness.

Figure 2A:
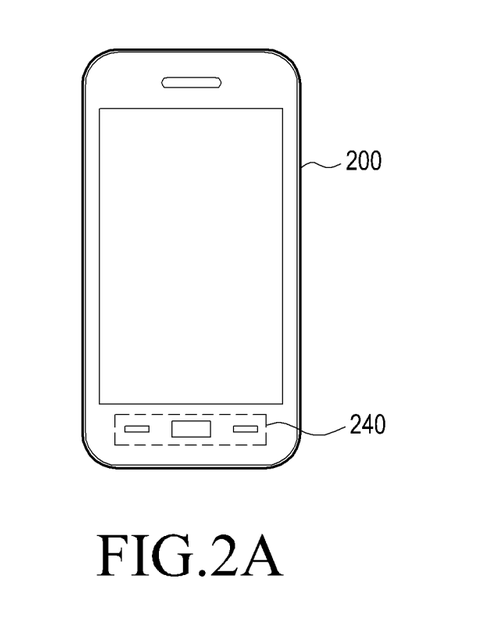
FIG. 2A illustrates a communication device with a touch screen having an electromagnetic sensing apparatus according to an embodiment of the present invention.

FIG. 2A illustrates a communication device 200 with a touch screen having an electromagnetic sensing apparatus according to an embodiment of the present invention.

Referring to FIG. 2A, the communication device 200 having the electromagnetic sensing apparatus according to the embodiment of the present invention includes soft keys 240.

The soft keys 240 are a type of a user interface provided separately from a display, which enables the user to intuitively perform basic functions such as back, cancel, menu display control, etc. The soft keys 240 may also operate in an ElectroMagnetic Resonance (EMR) scheme or a capacitive scheme.

Figure 2B:
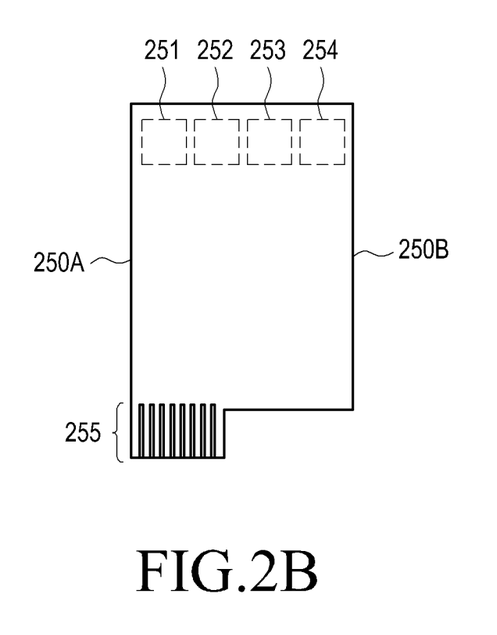
FIG. 2B illustrates the electromagnetic sensing apparatus included in the communication device illustrated in FIG. 2A.

FIG. 2B illustrates the electromagnetic sensing apparatus included in the communication device 200 illustrated in FIG. 2A. Referring to FIG. 2B, the electromagnetic sensing apparatus may include a Printed Circuit Board (PCB) 250 having a first end 250A, a second end 250B, and one or more sub-areas 251 to 254 corresponding to the respective soft keys 240 illustrated in FIG. 2A. The communication device 200 includes four soft keys 240 and the four sub-areas 251 to 254 may be defined in correspondence with the respective four soft keys 240. The PCB 250 may further include a connector 255.

While it is shown in FIG. 2B that an input/output value of the PCB 250 is received/transmitted from/to an external control device, for example, a mother board with a microprocessor mounted on it through the connector 255, rather than a controller is disposed on the PCB 250, those skilled in the art will readily understand that a controller (not shown) such as a microprocessor can be positioned on the PCB 250.

The connector 255 may include a signal transceiver for receiving/transmitting input/output signals of a plurality of channels. The connector 255 preferably takes the form of gold fingers, which should not be construed as limiting the present invention. While the connector 255 is shown as having eight channels in FIG. 2B, this is merely an example, and the present invention is not limited thereto.

Meanwhile, one or more sub-loops may be arranged in the sub-areas 251 to 254 from the first end 250A to the second end 250B of the PCB 250 to sense an electromagnetic field applied to the soft keys 240. The one or more sub-loops may be serially connected into a single sub-loop, sharing one channel. These sub-loops may be collectively referred to as a loop unit.

Layouts of a loop unit on the PCB, which are not shown in FIG. 2B, will be described below in greater detail.

Figure 3:
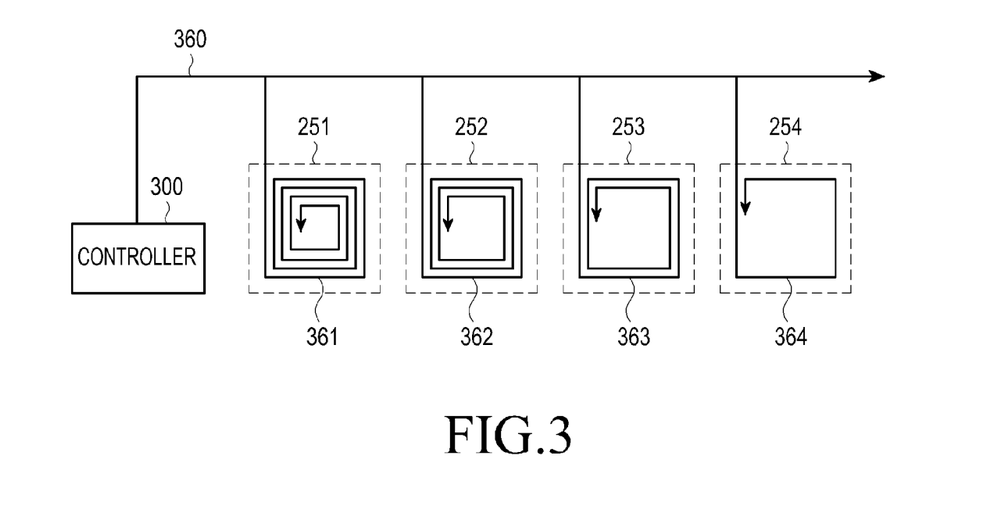
FIG. 3 illustrates a layout of a loop unit on a PCB according to an embodiment of the present invention.

FIG. 3 illustrates a layout of a loop unit 360 on the PCB 250 according to an embodiment of the present invention.

Referring to FIG. 3, the loop unit 360 may include first to fourth sub-loops 361 to 364 arranged respectively in the sub-areas 251 to 254 of the PCB 250 in generally a square or rectangular shape. One end of the loop unit 360 may be connected to an I/O channel of a controller 300 and a power voltage $V_{out}$ may be applied to the one end of the loop unit 360. Therefore, current for electromagnetic induction applied from the controller 300 or induced current from at least one of the sub-loops 361 to 364 may flow through the end of the loop unit 360 connected to the I/O channel.

For the same electromagnetic flux, the sub-loops 361 to 364 may induce current with different magnitudes. In the embodiment illustrated in FIG. 3, the sub-loops 361 to 364 differ in the number of coil windings. More specifically, the number of coil windings of the first sub-loop 361 arranged in the first sub-area 251 is four times larger than that of the fourth sub-loop 364 arranged in the fourth sub-area 254, the number of coil windings of the second sub-loop 362 arranged in the second sub-area 252 is three times larger than that of the fourth sub-loop 364 arranged in the fourth sub-area 254, and the number of coil windings of the third sub-loop 363 arranged in the third sub-area 253 is twice as large as that of the fourth sub-loop 364 arranged in the fourth sub-area 254. The sub-loops 361 to 364 may occupy the same area of coil windings.

For the same electromagnetic flux, the magnitude of current induced to a loop may be proportional to the area and number of coil windings of the loop. Accordingly, if other factors are under control, the magnitude of induced current from the first sub-loop 361 is four times larger than that of induced current from the fourth sub-loop 364, the magnitude of induced current from the second sub-loop 362 is three times larger than that of induced current from the fourth sub-loop 364, and the magnitude of induced current from the third sub-loop 363 is twice as large as that of induced current from the fourth sub-loop 364.

As described above, since the sub-loops 361 to 364 output induced current with different magnitudes, for the same electromagnetic flux, the controller 300 may determine a soft key corresponding to a user-selected sub-loop based on the magnitude of induced current.

More specifically, the controller 300 may read a pre-stored induced current magnitude database from a memory (not shown) and compare the value of induced current from the loop unit 360 with the read induced current magnitude database, to thereby determine the user-selected sub-loop.

For example, it is assumed that the induced current magnitude database for the sub-loops is given as Table 1 below.

TABLE 1

| Sub-loop | Induced current (mA) |
| --- | --- |
| $1^{st}$ sub-loop | 140 |
| $2^{nd}$ sub-loop | 115 |
| $3^{rd}$ sub-loop | 70 |
| $4^{th}$ sub-loop | 35 |

For instance, if the magnitude of induced current output to the controller 300 through the one end of the loop unit 360 is 118 mA, the controller 300 calculates the absolute values of the differences between the magnitude of the induced current output from the loop unit 360 with the values of the induced current magnitude database. If there is any absolute value below a value, the controller 300 may determine a sub-loop corresponding to the absolute value to be a user-selected sub-loop. For example, if the value is 10, the controller 300 may determine the second sub-loop 362 as the user-selected sub-loop because the absolute value, 3 of the difference between the magnitude of the induced current output from the loop unit 360 and the value of the second sub-loop 362 in the induced current magnitude database is smaller than 10. Therefore, the controller 300 may determine that the user has selected a soft key corresponding to the second sub-loop 362 and output related information so that the communication device 200 can control execution of a preset command corresponding to the soft key.

Figure 4:
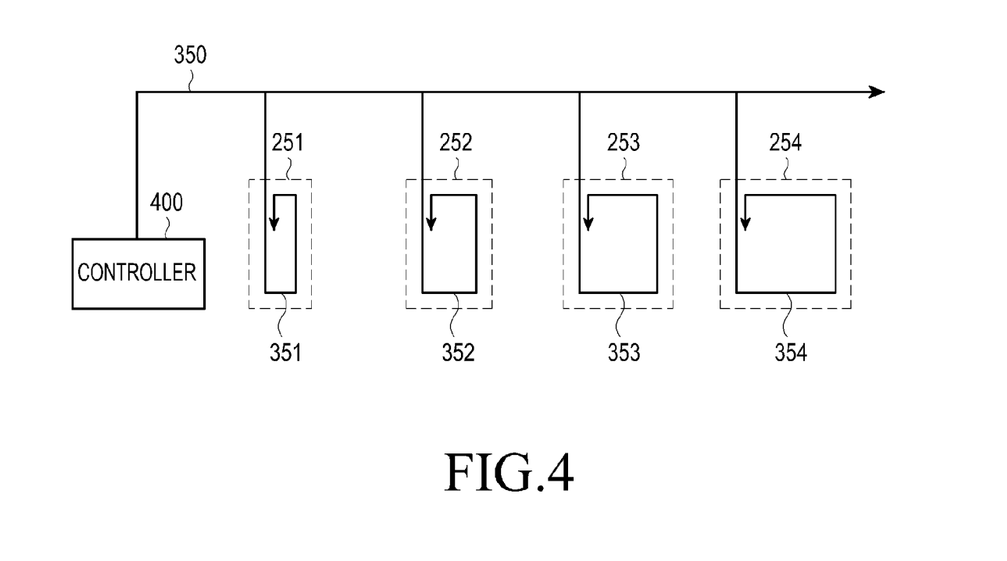
FIG. 4 illustrates a layout of a loop unit on a PCB according to another embodiment of the present invention.

FIG. 4 illustrates a layout of a loop unit 350 on the PCB 250 according to another embodiment of the present invention.

Referring to FIG. 4, the loop unit 350 may include first to fourth sub-loops 351 to 354 arranged respectively in the sub-areas 251 to 254 of the PCB 250. One end of the loop unit 350 may be connected to an I/O channel of a controller 400 and a power voltage $V_{out}$ may be applied to the one end of the loop unit 350. Therefore, current for electromagnetic induction applied from the controller 400 or induced current from at least one of the sub-loops 351 to 354 may flow through the end of the loop unit 350 connected to the I/O channel.

For the same electromagnetic flux, the sub-loops 351 to 354 may induce current with different magnitudes. In the embodiment illustrated in FIG. 4, the sub-loops 351 to 354 differ in the area of coil windings. More specifically, the area of coil windings of the fourth sub-loop 354 arranged in the fourth sub-area 254 is four times larger than that of the first sub-loop 351 arranged in the first sub-area 251, the area of coil windings of the third sub-loop 353 arranged in the third sub-area 253 is three times larger than that of the first sub-loop 351 arranged in the first sub-area 251, and the area of coil windings of the second sub-loop 352 arranged in the second sub-area 252 is twice as large as that of the first sub-loop 351 arranged in the first sub-area 251. The sub-loops 351 to 354 may have the same the number of coil windings.

For the same electromagnetic flux, the magnitude of current induced to a loop may be proportional to the area and number of coil windings of the loop. Accordingly, if other factors are under control, the magnitude of induced current from the first sub-loop 351 is one fourth of that of induced current from the fourth sub-loop 354, the magnitude of induced current from the second sub-loop 352 is one third of that of induced current from the fourth sub-loop 354, and the magnitude of induced current from the third sub-loop 353 is one half of that of induced current from the fourth sub-loop 354.

As described above, since the sub-loops 351 to 354 output induced current with different magnitudes, for the same electromagnetic flux, the controller 400 may determine a soft key corresponding to a user-selected sub-loop based on the magnitude of induced current.

More specifically, the controller 400 may read a pre-stored induced current magnitude database from a memory (not shown) and compare the value of induced current from the loop unit 350 with the read induced current magnitude database, to thereby determine the user-selected sub-loop.

Figure 5A:
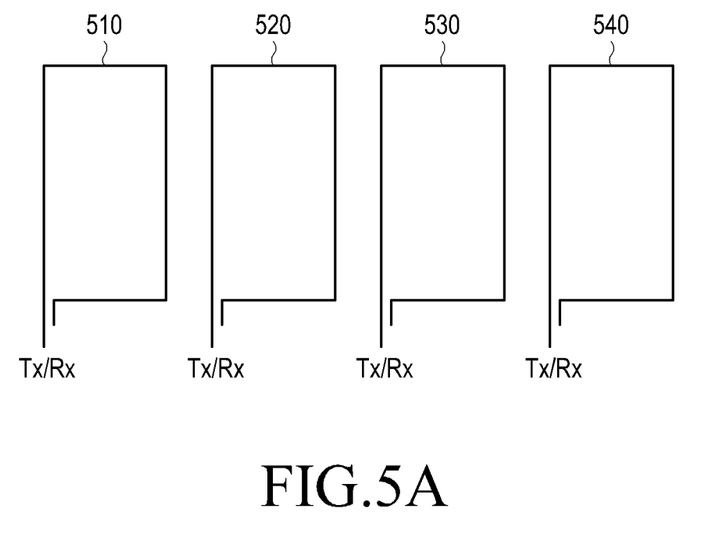
FIGS. 5A and 5B illustrate configurations for flowing current for electromagnetic induction and flowing induced current according to embodiments of the present invention.
Figure 5B:
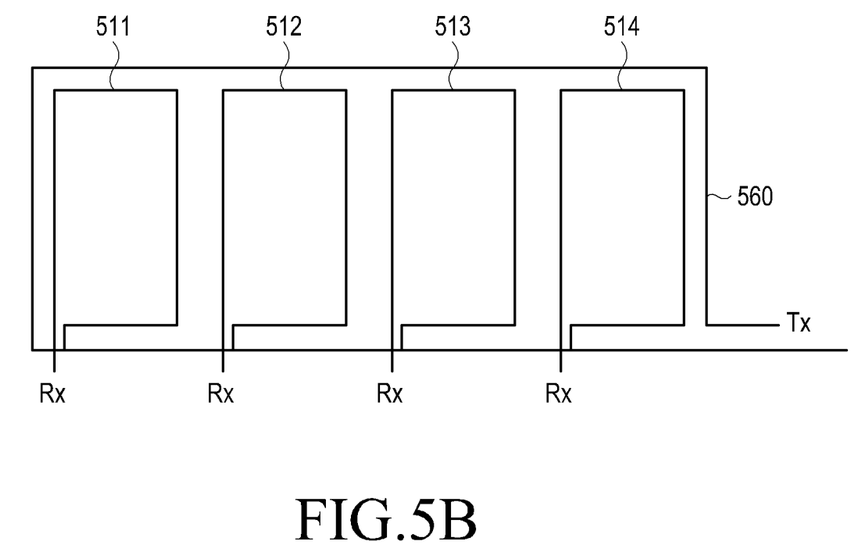

FIGS. 5A and 5B illustrate configurations for flowing current for electromagnetic induction and flowing induced current according to embodiments of the present invention.

FIG. 5A illustrates a plurality of sub-loops 510, 520, 530 and 540 through which current for electromagnetic induction and induced current flow. The plurality of sub-loops 510, 520, 530 and 540 may be arranged at positions corresponding to respective soft keys.

A controller which is connected to the plurality of sub-loops 510, 520, 530 and 540 and controls electromagnetic sensing may use the plurality of sub-loops 510, 520, 530 and 540 as means for flowing current for electromagnetic induction by flowing current with a magnitude through the loop unit of the sub-loops 510, 520, 530 and 540 for a first time period. In addition, the controller may use the plurality of sub-loops 510, 520, 530 and 540 as means for flowing induced current by receiving induced current from one of the sub-loops 510, 520, 530 and 540, discontinuing current flowing through them for a second time period.

That is, the controller may use the plurality of sub-loops 510, 520, 530 and 540 as means for flowing current for electromagnetic induction or means for flowing induced current, in time division.

FIG. 5B illustrates a plurality of sub-loops 511 to 514 through which induced current flows and an output loop unit 560 through which current for electromagnetic induction flows. The plurality of sub-loops 511 to 514 may be arranged at positions corresponding to respective soft keys.

The plurality of sub-loops 511 to 514 and the output loop unit 560 may be connected to a controller. The controller may flow current with a magnitude for electromagnetic induction through the output loop unit 560 and may receive induced current from the sub-loops 511 to 514. That is, the controller may use the sub-loops 511 to 514 as induced current flowing means in space division with the output loop unit 560.

Figure 6A:
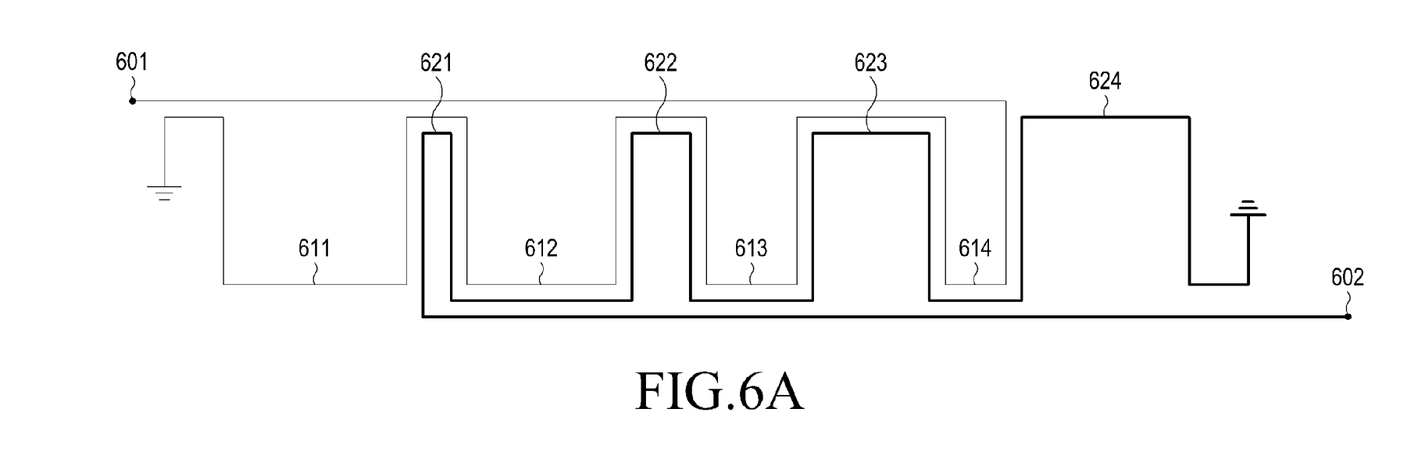
FIG. 6A describes an operation for determining a user-selected sub-loop using two Input/Output (I/O) channels according to an embodiment of the present invention.

FIG. 6A describes an operation for determining a user-selected sub-loop using two I/O channels according to an embodiment of the present invention.

Referring to FIG. 6A, a first loop unit connected to a first I/O channel 601 includes four first sub-loops 611 to 614 that occupy different areas of coil windings. A second loop unit connected to a second I/O channel 602 includes four second sub-loops 621 to 624 that occupy different areas of coil windings.

In accordance with the embodiment illustrated in FIG. 6A, the first sub-loops 611 to 614 may be arranged in such a manner that the areas of coil windings of the first sub-loops 611 to 614 decrease in the direction from the first end 250A end to the second end 250B of the PCB. For example, the first sub-loop 611 adjacent to the first I/O channel 601 occupies a larger coil winding area than the remaining first sub-loops 612, 613 and 614 in FIG. 6A. The area of coil windings of the first sub-loop 612 to the right of the first sub-loop 611 is smaller than that of the first sub-loop 611 and larger than that of the first sub-loop 613. In addition, the first sub-loop 613 is larger than the first sub-loop 614 in terms of the area of coil windings. Thus, the areas of coil windings of the first sub-loops 611 to 614 decrease from the first end 250A to the second end 250B of the PCB.

However, the second sub-loops 621 to 624 are arranged in such a manner that their areas of coil windings increase in the direction from the first end 250A to the second end 250B of the PCB. For example, the second sub-loop 624 adjacent to the second I/O channel 602 occupies a larger coil winding area than the remaining second sub-loops 621, 622 and 623 in FIG. 6A. The area of coil windings of the second sub-loop 623 to the left of the second sub-loop 624 is smaller than that of the second sub-loop 624 and larger than that of the second sub-loop 622. In addition, the second sub-loop 622 is larger than the second sub-loop 621 in terms of the area of coil windings. Thus, the coil area of the second sub-loops 621 to 624 is increased from the first end 250A to the second end 250B of the PCB.

As described above, the magnitude of induced current from a sub-loop is proportional to the area of coil windings of the sub-loop. The controller may determine a user-selected sub-loop based on the ratio between the magnitude of first induced current from the first loop unit connected to the first I/O channel 601 and the magnitude of second induced current from the second loop unit connected to the second I/O channel 602. For instance, the controller may determine the user-selected sub-loop according to a decision value calculated by Equation (1), as follows:

$$\text{Decision Value} = \frac{I_1 - I_2}{I_1 + I_2} \quad (1)$$

where $I_1$ and $I_2$ denote the magnitudes of the first and second induced current, respectively.

When a user selects the leftmost soft key, the first sub-loop 611 induces current with a large magnitude, whereas the second sub-loop 621 induces current with a small magnitude. Accordingly, the decision value may be positive-signed and its absolute value may be large according to Equation (1). In the case, the controller may determine that the leftmost soft key has been selected.

Table 2 below illustrates a relationship between decision values and user-selected soft keys according to an embodiment of the present invention.

TABLE 2

| Decision Value | Soft Key |
| --- | --- |
| Positive-signed large absolute value | $1^{st}$ soft key |
| Positive-signed small absolute value | $2^{nd}$ soft key |
| Negative-signed small absolute value | $3^{rd}$ soft key |
| Negative-signed large absolute value | $4^{th}$ soft key |

The controller may read a look-up table pre-stored in a memory like Table 2 and determine a user-selected soft key based on a determined decision value. In Table 2, first to fourth soft keys are numbered sequentially, starting from the left.

Figure 6B:
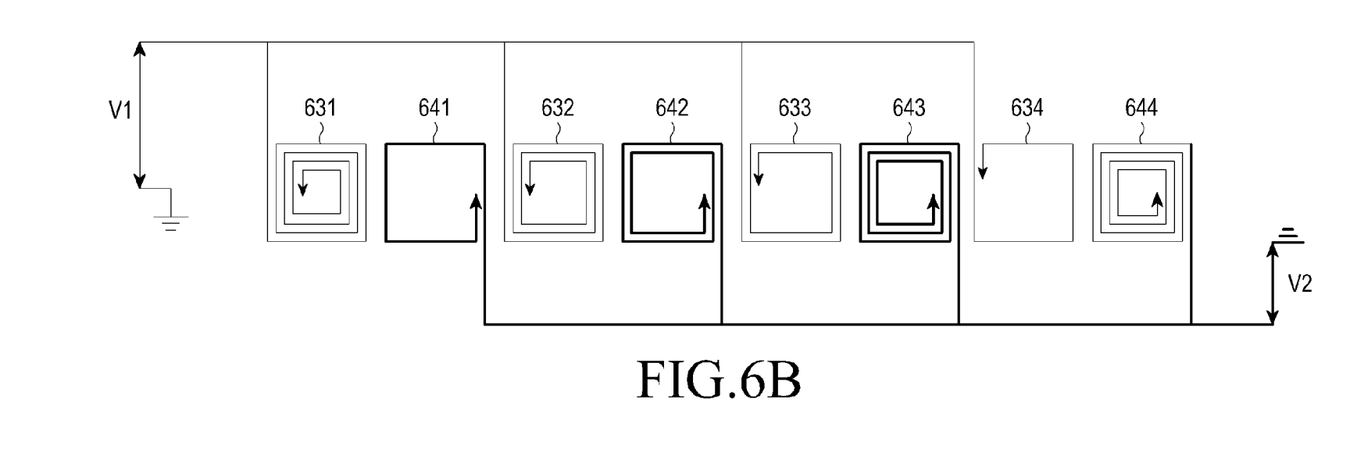
FIG. 6B describes an operation for determining a user-selected sub-loop using two I/O channels according to another embodiment of the present invention.

FIG. 6B describes an operation for determining a user-selected sub-loop using two I/O channels according to another embodiment of the present invention.

An electromagnetic sensing apparatus illustrated in FIG. 6B operates based on substantially the same principle of the electromagnetic sensing apparatus illustrated in FIG. 6A. The difference between them lies in that first sub-loops 631 to 634 have different numbers of coil windings in FIG. 6B. Since the magnitude of induced current from a sub-loop is proportional to the number and area of coil windings of the sub-loop as stated before, if the sub-loops occupy the same area of coil windings but have different numbers of coil windings as illustrated in FIG. 6B, a user-selected soft key may be determined based on the same principle as in FIG. 6A. Accordingly, a description of the manner in which the electromagnetic sensing apparatus of FIG. 6B determines a user-selected soft key will not be provided herein.

Figure 7:
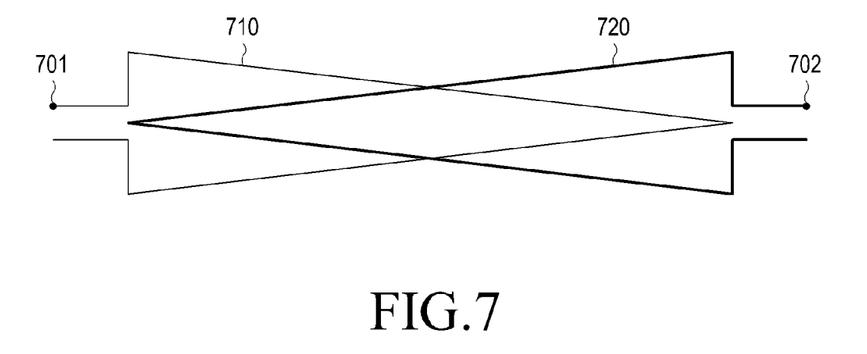
FIG. 7 describes an operation for determining a user-selected sub-loop using two I/O channels according to a further embodiment of the present invention.

FIG. 7 describes an operation for determining a user-selected sub-loop using two I/O channels according to a further embodiment of the present invention.

Referring to FIG. 7, the electromagnetic sensing apparatus may include a first loop unit 710 connected to a first I/O channel 701 and a second loop unit 720 connected to a second I/O channel 702.

The first loop unit 710 may be arranged in a triangle so that the area of coil windings of the first loop unit 710 decreases gradually from one end to the other end of the PCB. In contrast, the second loop unit 720 may be arranged in a triangle so that the area of coil windings of the second loop unit 720 increases gradually from the first end 250A to the second end 250B of the PCB.

As described before, the magnitude of induced current is proportional to the area of coil windings. Therefore, when an electromagnetic field exists near to the first I/O channel 701, the magnitude of induced current from the first loop unit 710 may be larger than that of induced current from the second loop unit 720.

When electromagnetic flux exists near to the second I/O channel 702, the magnitude of induced current from the first loop unit 710 may be smaller than that of induced current from the second loop unit 720.

Accordingly, a controller in the electromagnetic sensing apparatus of FIG. 7 may calculate a decision value according to Equation (1), in the manner of the controller of FIG. 6A. In addition, the controller may read a look-up table like Table 1 and determine a user-selected soft key based on a determined decision value.

The mechanism of determining a user-selected soft key based on a decision value has been described and thus a description thereof will not be provided herein.

Figure 8:
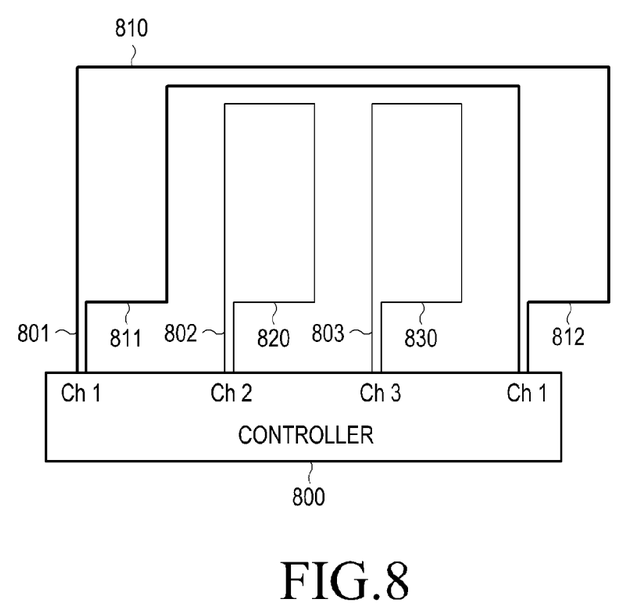
FIG. 8 illustrates an electromagnetic sensing apparatus using three I/O channels according to an embodiment of the present invention.

FIG. 8 illustrates an electromagnetic sensing apparatus using three I/O channels according to an embodiment of the present invention.

Referring to FIG. 8, the electromagnetic sensing apparatus may include a first loop unit 810 connected to a first I/O channel 801, a second loop unit 820 connected to a second I/O channel 802, and a third loop unit 830 connected to a third I/O channel 803.

When the user selects a second soft key, that is, a soft key corresponding to the second loop unit 820, the magnitude of induced current from the second loop unit 820 may be largest. Accordingly, a controller 800 may determine that the user has selected the second soft key. In the same manner, when the user selects a third soft key corresponding to the third loop unit 830, the magnitude of induced current from the third loop unit 830 may be largest and thus the controller 800 may determine that the user has selected the third soft key.

When the user selects a first or fourth soft key, the magnitude of induced current from the first loop unit 810 may be largest. However, the controller 800 may not determine whether the output of the first loop unit 810 is from a sub-loop corresponding to the first soft key or a sub-loop corresponding to the fourth soft key. In this case, the controller 800 may determine a user-selected soft key based on the magnitude of induced current from the second loop unit 820 or the third loop unit 830.

For example, when the user selects the first soft key, the second loop unit 820 outputs induced current with a larger magnitude than the third loop unit 830 because the first soft key is nearer to the second loop unit 820 than to the third loop unit 830. Therefore, if the magnitude of induced current from the first loop unit 810 is largest, the controller 800 may determine whether the first or fourth soft key has been selected based on the magnitudes of induced current from the second loop unit 820 and the third loop unit 830.

Figure 9:
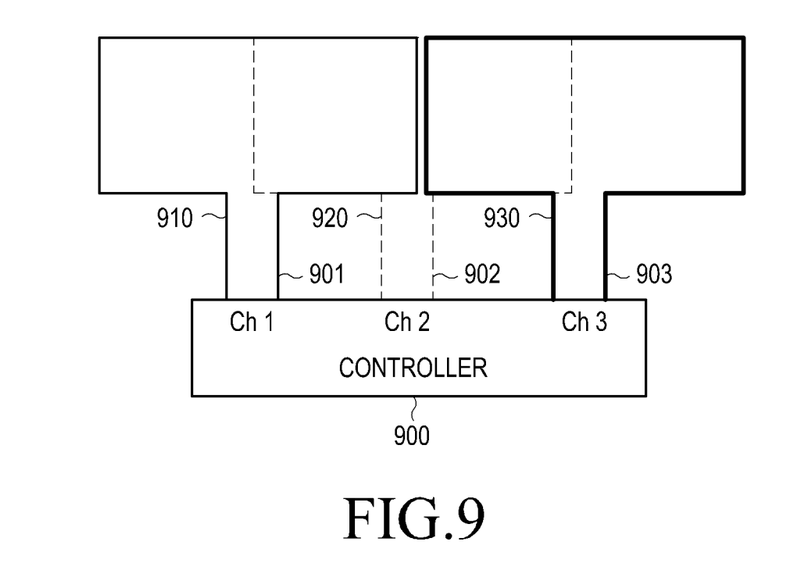
FIG. 9 illustrates an electromagnetic sensing apparatus using three I/O channels according to another embodiment of the present invention.

FIG. 9 illustrates an electromagnetic sensing apparatus using three I/O channels according to another embodiment of the present invention.

Referring to FIG. 9, the electromagnetic sensing apparatus may include a first loop unit 910 connected to a first I/O channel 901, a second loop unit 920 connected to a second I/O channel 902, and a third loop unit 930 connected to a third I/O channel 903.

As illustrated in FIG. 9, the first, second and third loop units 910, 920 and 930 may be arranged overlapping with each other.

In the embodiment of FIG. 9, when the user selects a first or fourth soft key, the first or third loop unit 910 or 930 may output induced current with a largest magnitude and thus a controller 900 may determine a user-selected soft key accordingly.

If the user selects a second or third soft key, the magnitude of induced current output from the second loop unit 920 may be largest. In this case, if the first loop unit 910 outputs induced current with a larger magnitude than the third loop unit 930, the controller 900 may determine that the second soft key has been selected. If the first loop unit 910 outputs induced current with a smaller magnitude than the third loop unit 930, the controller 900 may determine that the third soft key has been selected.

As is apparent from the embodiments of the present invention described above, an electromagnetic sensing apparatus can be provided, in which a small number of control circuit channels are used for coils arranged in a soft key area. The resulting reduction of the number of channels required for a control circuit decreases the size of the control circuit and the number of coils.

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. An electromagnetic sensing apparatus built in a touch screen having at least one soft key, the electromagnetic sensing apparatus comprising:
   a Printed Circuit Board (PCB) having at least one sub-area positioned in correspondence to the at least one soft key;
   a controller having at least one input/output channel, for controlling electromagnetic sensing of the electromagnetic sensing apparatus; and
   a loop unit extending from one of the at least one input/output channel, having at least one sub-loop arranged in the at least one sub-area on the PCB, and outputting current induced by an electromagnetic field, wherein each sub-loop outputs a different output value with respect to the electromagnetic field and is connected to the at least one input/output channel.

2. The electromagnetic sensing apparatus of claim 1, wherein the controller determines a user-selected soft key according to a magnitude of the induced current.

3. The electromagnetic sensing apparatus of claim 2, further comprising a memory for pre-storing an induced current magnitude database, wherein the controller determines the user-selected soft key based on the induced current magnitude database read from the memory.

4. The electromagnetic sensing apparatus of claim 1, wherein each sub-loop has a different number of coil windings.

5. The electromagnetic sensing apparatus of claim 1, wherein each sub-loop occupies a different area of coil windings.

6. The electromagnetic sensing apparatus of claim 1, wherein the controller applies current with a magnitude through the loop unit for a first time period and receives the induced current from the loops unit, discontinuing current flowing for a second time period.

7. The electromagnetic sensing apparatus of claim 1, further comprising an output loop unit arranged on the PCB, for flowing current with a magnitude, wherein the controller does not flow the current with the magnitude through the loop unit.

8. The electromagnetic sensing apparatus of claim 1, wherein each sub-loop is serially connected to the input/output channel.

9. An electromagnetic sensing apparatus built in a touch screen having at least one soft key, the electromagnetic sensing apparatus comprising:
   a Printed Circuit Board (PCB) having at least one sub-area positioned in correspondence to the at least one soft key;
   a controller having an input output channel, for controlling electromagnetic sensing of the electromagnetic sensing apparatus;
   a first loop unit extending from the input/output channel, having at least one first sub-loop arranged in the at least one sub-area on the PCB, and outputting first current induced by a sensed electromagnetic field; and
   a second loop unit extending from the input/output channel, having at least one second sub-loop arranged in the at least one sub-area on the PCB, and outputting second current induced by the sensed electromagnetic field.

10. The electromagnetic sensing apparatus of claim 9, wherein the controller determines a user-selected soft key from among the at least one soft key according to magnitudes of the first and second induced current.

11. The electromagnetic sensing apparatus of claim 10, wherein the controller determines the user-selected soft key according to a ratio between the magnitudes of the first and second induced current.

12. The electromagnetic sensing apparatus of claim 9, wherein each first sub-loop and each second sub-loop occupies a different area of coil windings.

13. The electromagnetic sensing apparatus of claim 9, wherein each first sub-loop and each second sub-loop has a different number of coil windings.

14. The electromagnetic sensing apparatus of claim 9, wherein the first loop unit includes a plurality of first sub-loops and the second loop unit includes a plurality of second sub-loops, and wherein each of the first sub-loops is shaped into a square or rectangle and an area of coil windings of each of the first sub-loops decreases from a first end to a second end of the PCB, and each of the second sub-loops is shaped into a square or rectangle and an area of coil windings of each of the second sub-loops increases from the first end to the second end of the PCB.

15. The electromagnetic sensing apparatus of claim 9, wherein the at least one first sub-loop and the at least one second sub-loop are serially connected to the input/output channel.

16. An electromagnetic sensing apparatus built in a touch screen having at least one soft key, the electromagnetic sensing apparatus comprising:
a Printed Circuit Board (PCB) having at least one sub-area positioned in correspondence to the at least one soft key;
a controller having an input/output channel, for controlling electromagnetic sensing of the electromagnetic sensing apparatus;
a first loop unit extending from the input/output channel, having at least one first sub-loop arranged in a part of the at least one sub-area on the PCB, and outputting first current induced by a sensed electromagnetic field;
a second loop unit extending from the input/output channel, having at least one second sub-loop arranged in a part of the at least one sub-area on the PCB, and outputting second current induced by the sensed electromagnetic field; and
a third loop unit extended from the input/output channel, having at least one third sub-loop arranged in a part of the at least one sub-area on the PCB, and outputting third current induced by the sensed electromagnetic field.

17. The electromagnetic sensing apparatus of claim 16, wherein the first loop unit includes two first sub-loops, one of the two first sub-loops being in a sub-area adjacent to a first end of the PCB and another of the two first sub-loops being in a sub-area adjacent to a second end of the PCB, the second loop unit includes a second sub-loop arranged adjacent to the first sub-loop arranged adjacent to the first end of the PCB, and the third loop unit includes a third sub-loop arranged adjacent to the first sub-loop arranged adjacent to the second one end of the PCB.

18. The electromagnetic sensing apparatus of claim 17, wherein when a magnitude of the second induced current is larger than magnitudes of the first and third induced current, the controller determines that a soft key corresponding to the second loop unit has been selected, and when the magnitude of the third induced current is larger than magnitudes of the first and second induced current, the controller determines that a soft key corresponding to the third loop unit has been selected.

19. The electromagnetic sensing apparatus of claim 17, wherein when a magnitude of the first induced current is larger than magnitudes of the second and third induced current, if the magnitude of the second induced current is larger than the magnitude of the third induced current, the controller determines that a soft key corresponding to the sub-area adjacent to the first end of the PCB has been selected, and if the magnitude of the third induced current is larger than the magnitude of the second induced current, the controller determines that a soft key corresponding to the sub-area adjacent to the second end of the PCB has been selected.

20. The electromagnetic sensing apparatus of claim 16, wherein the at least one first sub-loop, the at least one second sub-loop, and the at least one third sub-loop are serially connected to the input/output channel.

* * * * *